US006470442B1

(12) United States Patent
Arimilli et al.

(10) Patent No.: US 6,470,442 B1
(45) Date of Patent: Oct. 22, 2002

(54) PROCESSOR ASSIGNING DATA TO HARDWARE PARTITION BASED ON SELECTABLE HASH OF DATA ADDRESS

(75) Inventors: Ravi Kumar Arimilli, Austin; Leo James Clark, Georgetown; John Steve Dodson, Pflugerville; Guy Lynn Guthrie, Austin; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,286

(22) Filed: Jul. 30, 1999

(51) Int. Cl.[7] .............................................. B06F 15/76
(52) U.S. Cl. ........................ 712/32; 711/129; 711/153; 711/123; 709/104
(58) Field of Search ............................... 711/129, 153, 711/173; 712/32; 709/104

(56) References Cited

U.S. PATENT DOCUMENTS

| | | | |
|---|---|---|---|
| 4,646,237 A | 2/1987 | Allen ......................... 710/107 |
| 4,755,930 A | 7/1988 | Wilson, Jr. et al. .......... 711/122 |
| 4,933,940 A | 6/1990 | Walter et al. .................. 714/10 |
| 5,404,469 A | 4/1995 | Chung et al. ................ 712/215 |
| 5,463,739 A | 10/1995 | Albaugh et al. ................ 710/6 |
| 5,499,350 A | 3/1996 | Uchida et al. ............... 712/220 |
| 5,546,535 A | 8/1996 | Stallmo et al. ................. 714/9 |
| 5,649,090 A | 7/1997 | Edwards et al. .............. 714/10 |
| 5,694,567 A | 12/1997 | Bourekas et al. .............. 711/3 |
| 5,713,001 A | 1/1998 | Eberhard et al. ............ 711/216 |
| 5,854,913 A | 12/1998 | Goetz et al. ................. 712/210 |
| 5,860,101 A | * 1/1999 | Arimilli et al. .............. 711/121 |
| 5,893,163 A | * 4/1999 | Arimilli et al. .............. 711/153 |
| 5,933,860 A | * 8/1999 | Emer et al. .................. 711/213 |
| 5,956,751 A | 9/1999 | Lai ............................. 711/172 |
| 5,974,538 A | 10/1999 | Wilmot, II ................... 712/218 |
| 5,996,060 A | 11/1999 | Mendelson et al. .......... 712/205 |
| 6,081,880 A | 1/2000 | Sollars ......................... 711/202 |
| 6,038,647 A | 3/2000 | Shimizu ....................... 711/168 |
| 6,094,710 A | * 7/2000 | Arimilli et al. .............. 711/153 |
| 6,128,641 A | 10/2000 | Fleck et al. .................. 709/108 |
| 6,138,209 A | * 10/2000 | Krolak et al. .................. 71/128 |
| 6,141,707 A | 10/2000 | Halligan et al. ............... 710/36 |
| 6,175,770 B1 | 1/2001 | Bladow .......................... 700/2 |
| 6,199,179 B1 | 3/2001 | Kauffman et al. ............. 714/26 |
| 6,209,059 B1 | 3/2001 | Ofer et al. ................... 711/114 |
| 6,205,519 B1 | * 5/2001 | Aglietti et al. ............... 711/133 |
| 6,282,630 B1 | 8/2001 | Nguyen et al. ................ 712/23 |

OTHER PUBLICATIONS

Neefs, Hank et al., "A Technique for High Bandwidth and Deterministic Low Latency Load/Store Accesses to Multiple Cache Banks," IEEE Sixth International Symposium on High–Performance Computer Architecture, 1999, pp. 313–324.

Cho, Sangyeun et al.,"Decoupling Local Variable Accesses in a Wide–Issue Superscalar Processor, " IEEE Proceedings of the 26th International Symposium on Computer Architecture, 1999, pp. 100–110.

(List continued on next page.)

Primary Examiner—Kenneth S. Kim
(74) Attorney, Agent, or Firm—Casimer K. Salys; Bracewell & Patterson, L.L.P.

(57) ABSTRACT

A processor includes execution resources, data storage, and an instruction sequencing unit, coupled to the execution resources and the data storage, that supplies instructions within the data storage to the execution resources. At least one of the execution resources, the data storage, and the instruction sequencing unit is implemented with a plurality of hardware partitions of like function for processing data. The data processed by each hardware partition is assigned according to a selectable hash of addresses associated as with the data. In a preferred embodiment, the selectable hash can be altered dynamically during the operation of the processor, for example, in response to detection of an error or a load imbalance between the hardware partitions.

20 Claims, 6 Drawing Sheets

OTHER PUBLICATIONS

Yoaz, Adi et al., "Speculation Techniques for Improving Load Related Instruction Scheduling," IEEE Proceedings on the 26$^{th}$ International Symposium on Computer Architecture, 1999, pp. 42–53.

Leupers et al., "Retargetable Assembly Code Generation by Bootstrapping," IEEE, pp.: 88–93, May 1994.

Marwedel, "Code Generation for Core Processors," IEEE, pp. 232–237, Jun. 197.

Gupta et al., "Demonstration of Automatic Data Partitioning Techniques for Parallelizing Compilers on Multicomputers," IEEE, pp. 179–193, Mar. 1992.

Liem et al., "Address Calculation for Retargetable Compilation and Exploration of Instruction–Set Architectures," ACM, pp. 597,600, Jun. 1996.

* cited by examiner

PROCESSOR ASSIGNING DATA TO HARDWARE PARTITION BASED ON SELECTABLE HASH OF DATA ADDRESS

CROSS REFERENCE TO RELATED APPLICATIONS

The present application is related to the following copending applications, which are filed on even date herewith and incorporated herein by reference:

(1) U.S. application Ser. No. 09/364,284, titled A Data Processing System with HSA (Hashed Storage Architecture), Arimilli et al., filed Jul. 30, 1999;

(2) U.S. application Ser. No. 09/364,283, titled Data Processing System Having Hashed Architected Processor Facilities, Arimilli et al., filed Jul. 30, 1999;

(3) U.S. application Ser. No. 09/364,282, titled Compiler and Instruction Optimizations for a Data Processing System with HSA (Hashed Storage Architecture), Arimilli et al., filed Jul. 30, 1999;

(4) U.S. application Ser. No. 09/364,287, titled Address Dependant Caching Behavior Within a Data Processing System Having HSA (Hashed Storage Architecture), Arimilli et al., filed Jul. 30, 1999;

(5) U.S. application Ser. No. 09/364,288, titled Heterogeneous Load/Store Units Within a Data Processing System Having HSA (Hashed Storage Architecture), Arimilli, et al., filed Jul. 30, 1999;

(6) U.S. application Ser. No. 09/364,285, titled Asymmetrical Cache Properties Within a Hashed Storage Subsystem, Arimilli et al., filed Jul. 30, 1999; and (7) U.S. application Ser. No. 09/364,281, titled Method for Providing High Availability Within a Data Processing System Via a Reconfigurable Hashed Storage Subsystem, Arimilli et al., filed Jul. 30, 1999.

BACKGROUND OF THE INVENTION

1. Technical Field:

The present invention relates in general to data processing and, in particular, to the storage subsystem of a data processing system. Still more particularly, the present invention relates to a processor and data processing system having a hashed and partitioned storage subsystem.

2. Description of the Related Art

In order to capitalize on the high performance processing capability of a state-of-the-art processor 5 core, the storage subsystem of a data processing system must efficiently supply the processor core with large amounts of instructions and data. Conventional data processing systems attempt to satisfy the processor core's demand for instructions and data by implementing deep cache hierarchies and wide buses capable of operating at high frequency. Although heretofore such strategies have been somewhat effective in staying apace of the demands of the core as processing frequency has increased, such strategies, because of their limited scalability, are by themselves inadequate to meet the data and instruction consumption demands of state-of-the-art and future processor technologies operating at 1 GHz and beyond.

SUMMARY OF THE INVENTION

To address the above and other shortcomings of conventional processor and data processing system architectures, the present invention introduces a processor having a hashed and partitioned storage subsystem. A processor includes execution resources, data storage, and an instruction sequencing unit, coupled to the execution resources and the data storage, that supplies instructions within the data storage:to the execution resources. At least one of the execution resources, the data storage, and the instruction sequencing unit is implemented with a plurality of hardware partitions of like function for processing data. The data processed by each hardware partition is assigned according to a selectable hash of addresses associated with the data. In a preferred embodiment, the selectable hash can be altered dynamically during the operation of the processor, for example, in response to detection of an error or a load imbalance between the hardware partitions.

All objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF ILLUSTRATIVE EMBODIMENT

Figure 1:
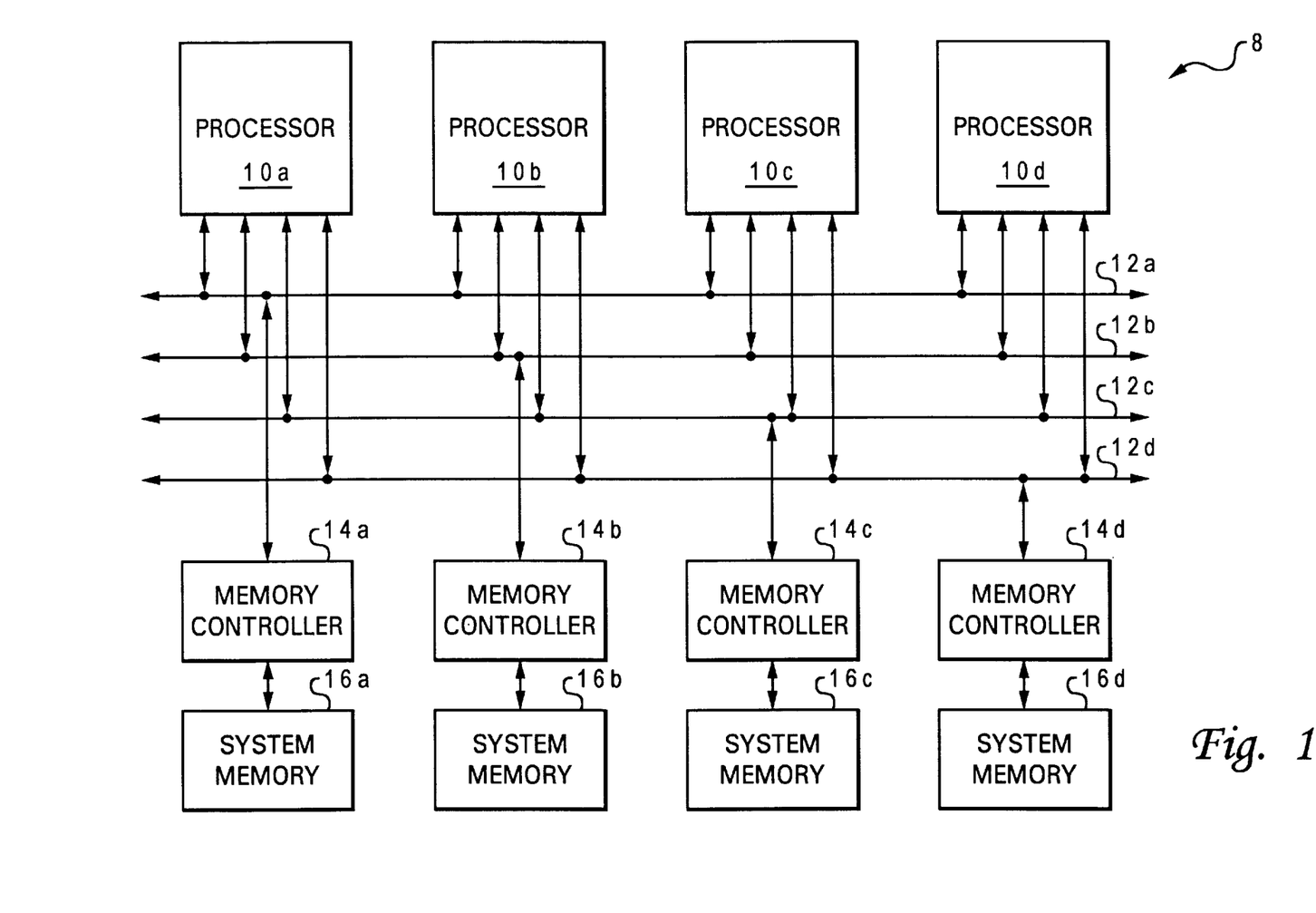
FIG. 1 depicts an illustrative embodiment of a multiprocessor data processing system in accordance with the present invention.

With reference now to the figures and in particular with reference to FIG. 1, there is illustrated a high s level block diagram of a multiprocessor data processing system in accordance with the present invention. As depicted, data processing system 8 includes a number of processors 10a–10d, which each comprise a single integrated circuit including a processor core and an on-chip cache subsystem, as discussed further below. Processors 10a–10d are all connected to each of system interconnects 12a–12d, which are in turn each coupled to a respective one of system memories 16a–16d through an associated one of memory controllers 14a–14d.

According to an important aspect of the present invention, data processing system 8 implements a hashed and partitioned storage subsystem. That is, instead of the single memory controller and system memory implemented in many conventional data processing systems, the present invention partitions the system memory hardware into multiple memory controllers 14a–14d and multiple system memories 16a–16d. System memories 16a–16d can each contain only a respective subset of all memory addresses, such that the disjoint subsets contained in all of system memories 16 together form the system memory data set. For example, each of system memories 16 may have a storage capacity of 2 GB for a total collective storage capacity of 8 GB. The subset of memory addresses assigned to each system memory 16 is determined by a hash algorithm implemented by each of processors 10a–10d, as discussed further below.

System interconnects 12a–12d serve as conduits for transactions between processing units 10 transactions between processing units 10 and memory controllers 14, and transactions between processors 10 or memory controllers 14 and other snoopers (e.g., I/O controllers) that may be coupled to system interconnects 12. By virtue of the fact that each system interconnect 12 is connected to less than all of memory controllers 14 (and in the illustrated embodiment only one), each system interconnect 12 conveys only transactions that pertain to the addresses subset(s) assigned to the attached memory controller(s) 14. Advantageously, system interconnects 12, which may each be implemented as one or more buses or as a cross-point switch, can be implemented with the same or different architectures, bandwidths, and communication protocols, as will become apparent.

Figure 2:
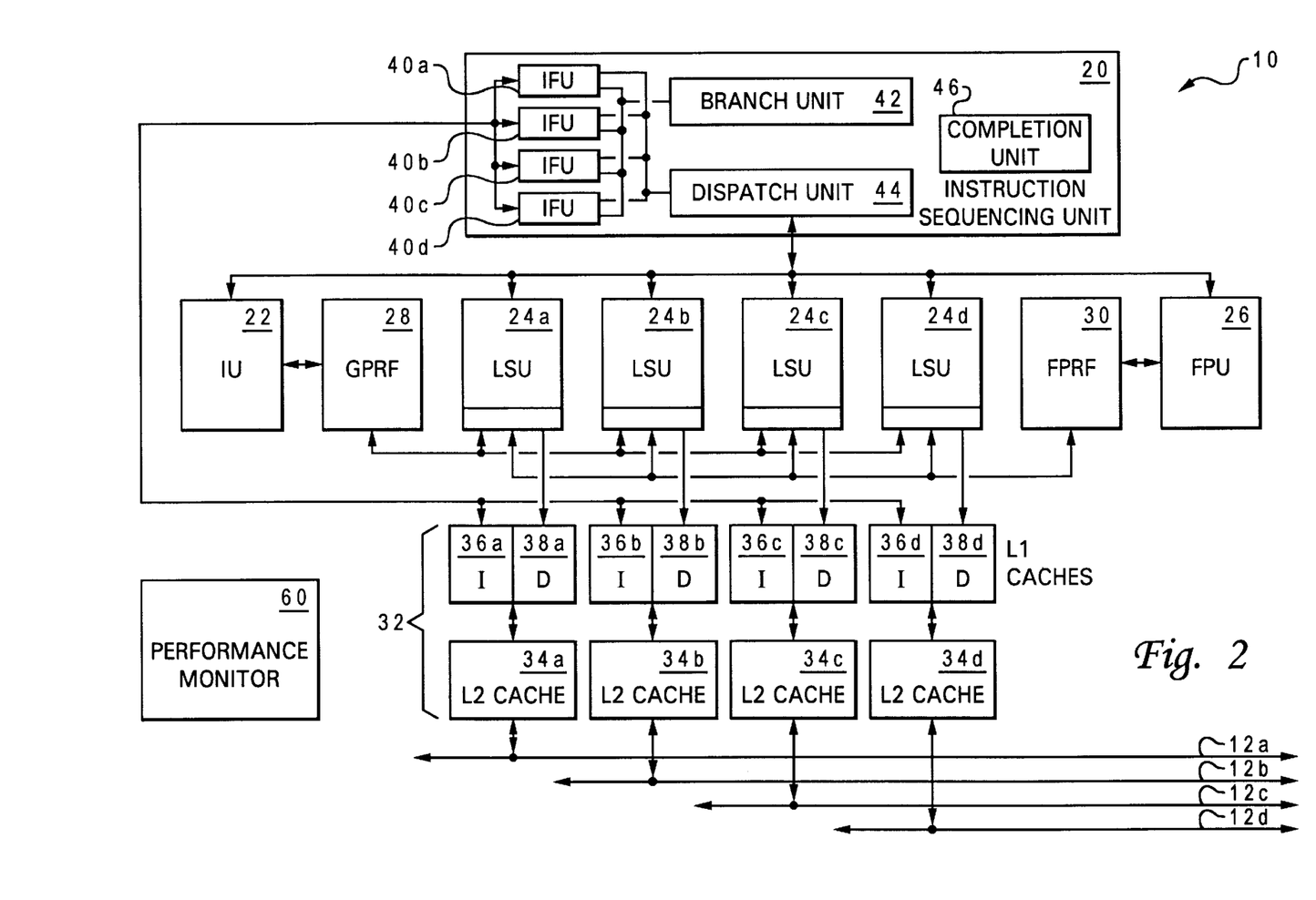
FIG. 2 illustrates a more detailed block diagram of a processor in the multiprocessor data processing system of FIG. 1.

The hashing and partitioning of the storage subsystem of data processing system 8 is not limited in application to memory controllers 14 and system memories 16, but preferably extends to the instruction fetch units (IFUs), load-store units (LSUs), register files, and cache subsystems of processors 10. Referring now to FIG. 2, there is illustrated a high level block diagram of a processor 10 within data processing system 8 of FIG. 1. As shown, processor 10 includes three principal collections of circuitry: instruction sequencing unit 20, execution units 22, 24a–24d and 26, and data storage including register files 28 and 30 and cache subsystem 32.

In the illustrative embodiment, cache subsystem 32, which provides low latency storage for data and instructions likely to be processed by the execution units of processor 10, includes level two (L2) caches 34a–34d and bifurcated level one (L1) instruction and data caches 36a–36d and 38a–38d, respectively. In the illustrative embodiment, L1 instruction caches 36 may be 32 kB each, L1 data caches 38 may be 16 kB. each, and L2 caches 34 may be 512 kB each, for combined cache capacities of 128 kB of L1 instruction cache, 64 kB of L1 data cache, and 2 MB of L2 cache. Of course, if desired, cache subsystem 32 may also include additional levels of on-chip or off-chip in-line or lookaside caches.

As indicated by the interconnection of L1 caches 36 and 38 to respective L2 caches 34a–34d and the interconnection of L2 caches 34a–34d to respective system interconnects 12a–12d, each L1 cache 36, 38 and each L2 cache 34 can store only data and instructions having addresses within the subset of addresses contained in system memories 16 coupled to the associated interconnect. Thus, in the illustrated example, L1 caches 36a and 38a and L2 cache 34a can only cache data and instructions residing in system memory 16a, L1 caches 36b and 38b and L2 cache 34b can only cache data and instructions residing in system memory 16b, etc.

Instruction sequencing unit 20 contains a number of instruction fetch units (IFUs) 40a–40d that are each coupled to a respective one of L1 instruction cache 36a–36d. Thus, each IFU 40 has an affinity to a particular address subset. IFUs 40 independently fetch instructions from the associated L1 instruction caches 36 and pass fetched instructions to either branch unit 42 or dispatch unit 44, depending upon whether the instructions are branch or sequential instructions, respectively. Branch instructions are processed directly by branch unit 42, but sequential instructions are opportunistically assigned by dispatch unit 44 to one of execution units 22, 24a–24d and 26 as execution resources (e.g., registers and a slot in completion buffer 46) become available. Dispatch unit 44 assigns instructions to execution units 22, 24a–24d and 26 according to instruction type and, if a load or store instruction, the target address of the instruction. In other words, integer and floating point instructions are dispatched to integer unit (IU) 22 and floating-point unit (FPU) 26, respectively, while load and store instructions are dispatched to particular ones of LSUs 24a–24d after dispatch unit 44 hashes the target address specified by the instruction to determine which L1 data cache 38 contains the target data. Thus, each of LSUs 24 executes only those load and store instructions targeting addresses within the particular address subset with which the associated L1 cache has affinity.

Figure 3A:
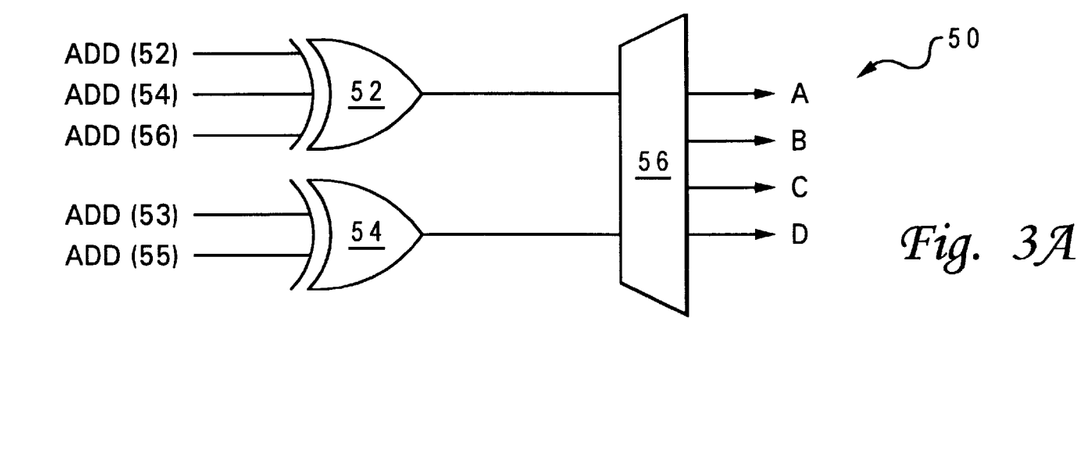
FIG. 3A depicts a circuit that can implement an exemplary hashing algorithm on selected address bits.
Figure 3B:
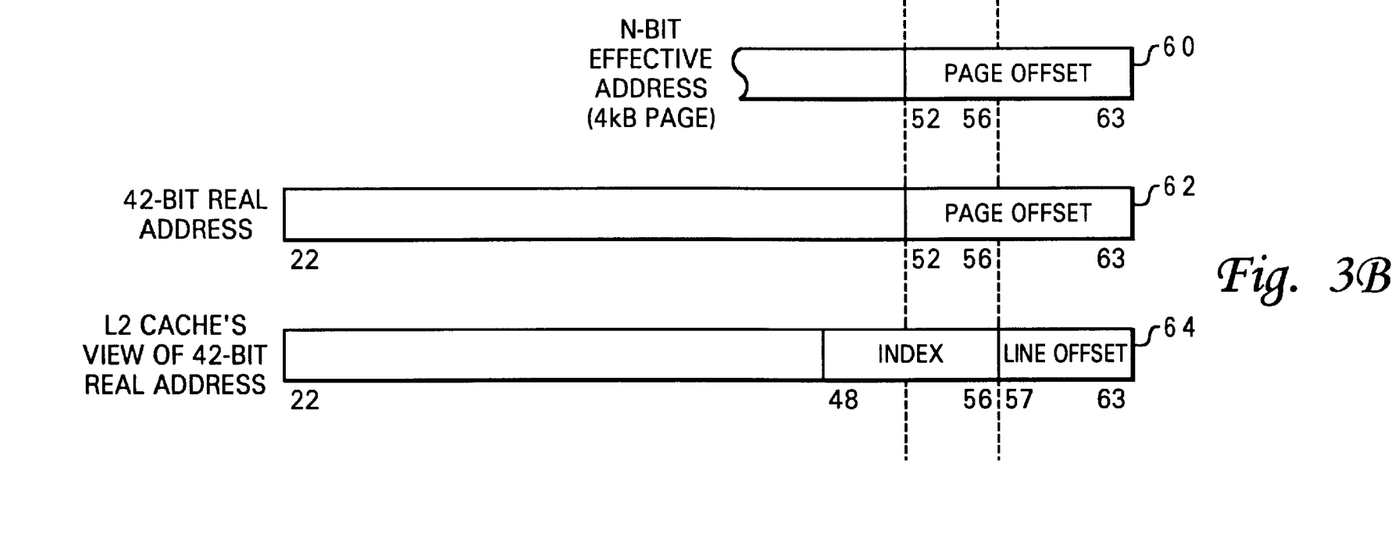
FIG. 3B illustrates the bit positions of the address bits forming inputs to the exemplary hashing algorithm shown in FIG. 3A.

The hash algorithm implemented by dispatch unit 44, which is programmable and can be altered dynamically during operation of data processing system 8 as discussed below, can be based on any type of address (e.g., effective address, virtual address, or real (physical) address) or any combination of address types. Referring now to FIG. 3A, there is illustrated a block diagram of exemplary hashing circuit that utilizes five low order bits, which are present in effective, virtual, and real addresses, to hash an input address into one of four address subsets A–D. As shown in FIG. 3B, the five input bits, designated bits 52–56, form the high order bits of the 12-bit page offset within both the N-bit (e.g., 64-bit) effective addresses 60 utilized by processors 10 and the 42-bit real addresses 62 utilized by cache subsystem 32, memory controllers 14, and other coupled to system interconnects 12. In addition, the five selected bits form the low order bits of the index portion of the 42-bit real address 64 utilized to select a congruence class within L2 caches 34. As depicted in FIG. 3A, the exemplary hashing algorithm performs an exclusive-OR of bits 52, 54 and 56 (e.g., with an XOR gate 52) and an exclusive-OR of bits 53 and 55 (e.g., with an XOR gate 54) and decodes the two-bit result with a decoder 56 to select one of the four address subsets.

In the illustrative embodiment, dispatch unit 44 is the only point of centralization or interaction between the different instruction and data pipelines. As a consequence, if operations such as synchronizing instructions (e.g., SYNC) must be made visible to all caches or all system interconnects, dispatch unit 44 broadcasts such operations to all LSUs 24. The synchronizing instructions are thereafter made visible on all system interconnects 12.

Figure 4A:
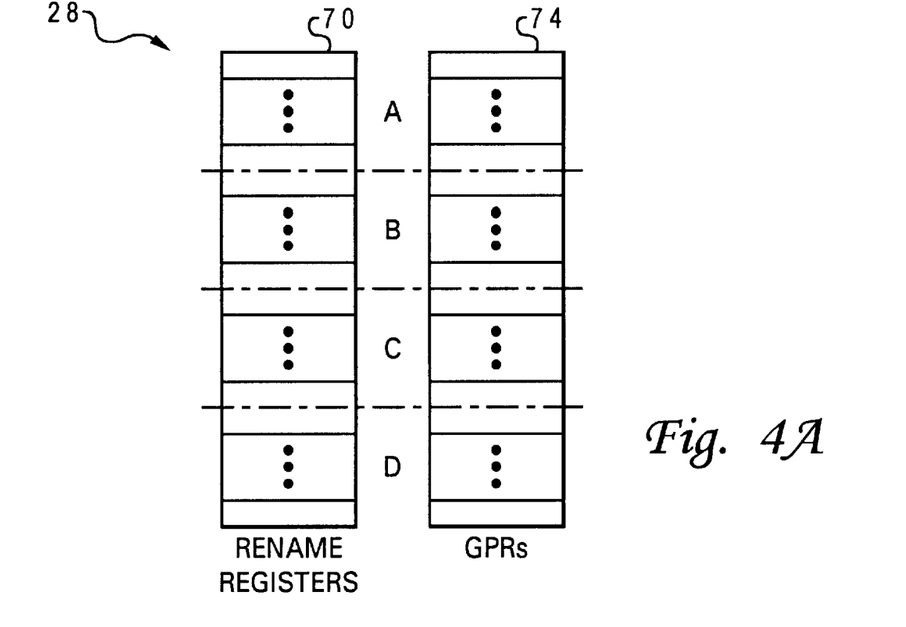
FIGS. 4A and 4B respectively depict more detailed block diagrams of the general purpose. register file (GPRF) and floating-point register file (FPRF) of the processor of FIG. 2.
Figure 4B:
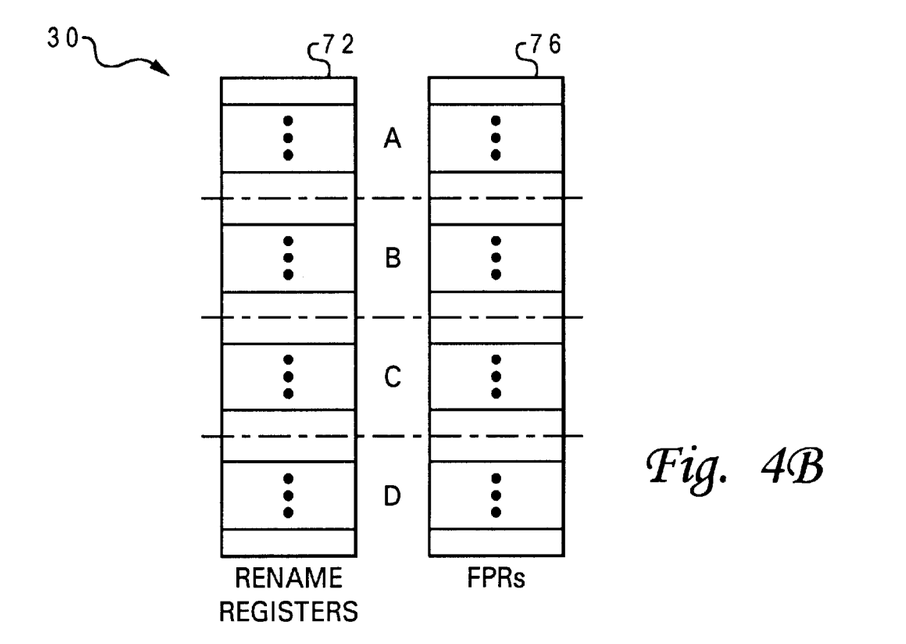

Referring again to FIG. 2, general purpose register file (GPRF) 28 and floating-point register file (FPRF) 30 are utilized to temporarily store integer and floating-point operands consumed by and resulting from instruction execution. Thus, IU 22 is coupled to GPRF 28, FPU 26 is coupled to FPRF 30, and GPRF 28 and FPRF 30 are each coupled to one or more (and possibly all) of LSUs 24. As shown in FIGS. 4A and 4B, which respectively illustrate more detailed views of GPRF 28 and FPRF 30, each register file contains a respective set of rename registers 70, 72 for temporarily storing result data produced by the execution of instructions and a set of architected registers 74, 76 for storing operand and result data. Result data is transferred from rename registers 70, 72 to the associated set of architected registers 74, 76 following execution of an instruction under the direction of completion unit 46 within ISU 20.

In accordance with the present invention, each of rename registers 70, 72 and architected registers 74, 76 may be partitioned between the various hashes so that only result data from instructions residing at and/or targeting addresses within the subset defined by a hash are stored in rename and architected registers associated with that hash. It is important to note that the number of registers allocated to each hash within each of register sets 70, 72, 74 and 76 can differ and the number of rename and architected registers allocated to each hash may be programmable or dynamically alterable during operation of processor 10, for example, in response to an on-chip performance monitor 60 detecting a threshold number of dispatch stalls for instructions having addresses within a particular address subset.

There are several ways in which the enhanced parallelism of the hashed and partitioned storage subsystem of the present invention can be exploited. For example, a compiler can be optimized to allocate different classes of data, for example, instructions, data, and the instruction page table entries and data page table entries utilized for address translation, to different address subsets. Alternatively, the classes of data assigned to each address subset may be data for different types of applications, for example, technical or commercial. The compiler can also distribute variables accessed by software among the various address subsets to maximize utilization of LSUs 24.

Figure 5:
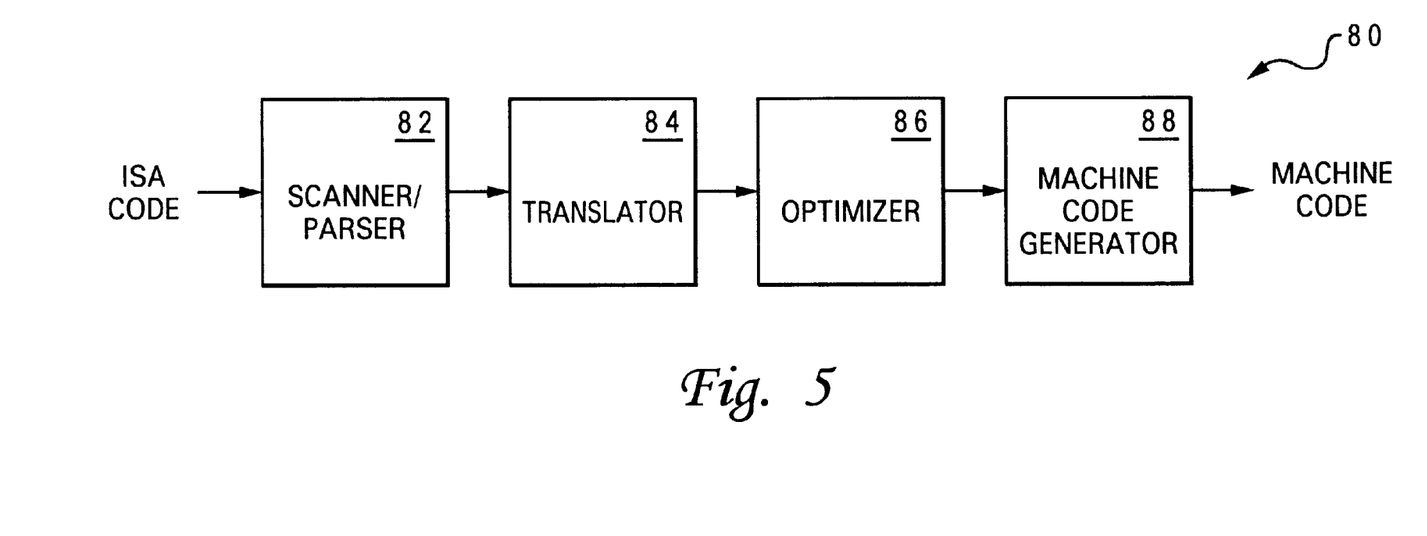
FIG. 5 is a block diagram of an exemplary embodiment of a compiler in accordance with the present invention.

With reference now to FIG. 5, there is depicted a block diagram of an illustrative embodiment of a compiler that implements the optimizations described above. In the illustrative embodiment, compiler 80 includes a scanner/parser 82 that, in response to receipt of an instruction set architecture (ISA) source program as an input, tokenizes the ISA source program and verifies program syntax according to a defined context-free grammar. Scanner/parser 82 outputs a syntactic structure representing the program to translator 84. Translator 84 receives the output of scanner/parser 82 and generates either an intermediate code representation or target machine code after verifying that the constructs parsed by scanner/parser 82 are legal and meaningful in context. According to the illustrative embodiment, an optimizer 86 receives an intermediate code representation produced by translator 84 and optimizes the location of variables in memory, register utilization, etc., as described above by reference to a hashing algorithm known to be implemented by dispatch unit 44. The optimized intermediate code output by optimizer 86 is then utilized by machine code generator 88 to produce a target machine code executable by a processor 10.

Figure 6:
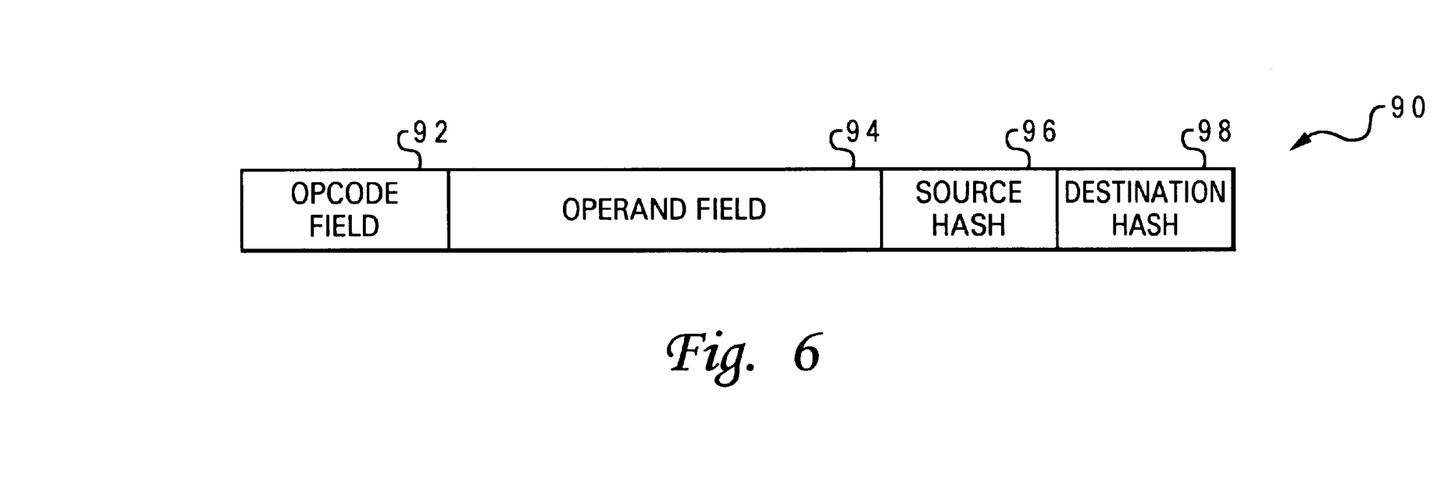
FIG. 6 illustrates an exemplary embodiment of an instruction within the instruction set architecture (ISA) of the processor depicted in FIG. 2.

Alternatively, or in addition to such compiler optimizations, the hashed and partitioned subsystem of the present invention can be exploited by incorporating an awareness of the hashing of memory addresses into the instruction set architecture (ISA) of processors 10. For example, FIG. 6 illustrates an ISA instruction 90 that, in addition to conventional opcode and operand fields 92 and 94, includes optional source and destination hash fields 96 and 98. Thus, a programmer could be permitted, by supplying value(s) within hash fields 96 and 98, to explicitly direct the compiler as to which address subset source data is drawn and the address subset to which result data is stored.

The above compiler and ISA mechanisms for directing data to selected address subsets are particularly advantageous when the hardware partitions having affinity with the various address subsets are individually tailored for the type and amount of data anticipated to be within each address subset. In other words, to enhance performance each hardware partition can be implemented differently from the others. For example, the hardware of some of LSUs 24 can be devoted to execution of only integer loads and stores (i.e., be connected to only GPRF 28), while the hardware of other LSUs 24 can be capable of executing only floating-point loads and stores (i.e., be connected to only FPRF 30). In addition, certain of LSUs 24 be implemented with duplicate hardware such that multiple load and store instructions targeting addresses within the address subset associated with those LSUs 24 by the hash algorithm can be executed in parallel.

Each level of cache can also be heterogeneous. For example, caches of the same type (e.g., L1 instruction cache, L1 data cache, and L2 cache) can be designed or configured with differing sizes, associativities, coherence protocols, inclusivities, sectoring, replacement policies, and prefetch behaviors. Such diversity among caches is particularly useful if different data types are allocated to different address subsets. For example, if the compiler is optimized to assign all locks to a small address subset, the caches having affinity to that address subset can be limited to a small size to reduce access latency and therefore improve system performance on updates to shared data. The "lock" caches may also exhibit a different behavior from caches associated with other address subsets, for example, a store-through (or store-with-update) rather than a write-back protocol, to make the release of a lock visible to other processors 10 via a particular system interconnect 12 in response to execution of a store-conditional instruction.

As noted above, the implementation of diverse hardware components of the same type can also extend to system interconnects 12, and can also extend to memory controllers 14 and system memories 16. For example, a particular memory controller 14 in FIG. 1 can be implemented with duplicate memory controller hardware operating in parallel, and different memory controllers 14 can access the associated system memory 16 differently to retrieve a requested cache line of data (e.g., horizontal versus vertical slicing of memory) In addition, different system memories 16 can be implemented with differing memory technologies, for example, synchronous dynamic access memory (SDRAM) versus DRAM, differing module sizes, etc.

The hashed and partitioned storage subsystem of the present invention also preferably supports dynamic hash optimization and dynamic repair capability. In a conventional processor having only one cache at each level in a cache hierarchy and single instances of other storage subsystem circuitry, the occurrence of a double-bit ECC error in a particular cache or circuit would disable the processor. In contrast, if a double-bit ECC error (which is not correctable) is detected within a particular hardware partition of a processor 10 in accordance with the present invention, the hashing algorithm implemented by dispatch unit 44 can be altered dynamically to redistribute all addresses within the address subset associated with the defective partition to one or more of the other address subsets, thus idling the defective hardware (which may also be disabled). The hashing algorithm implemented by dispatch unit 44 can also be modified to redistribute the subsets to which memory addresses belong while retaining the full number of subsets, for example, to maximize LSU utilization, to improve address bus and/or data bus utilization or to reduce single-bit (soft) errors.

Figure 7:
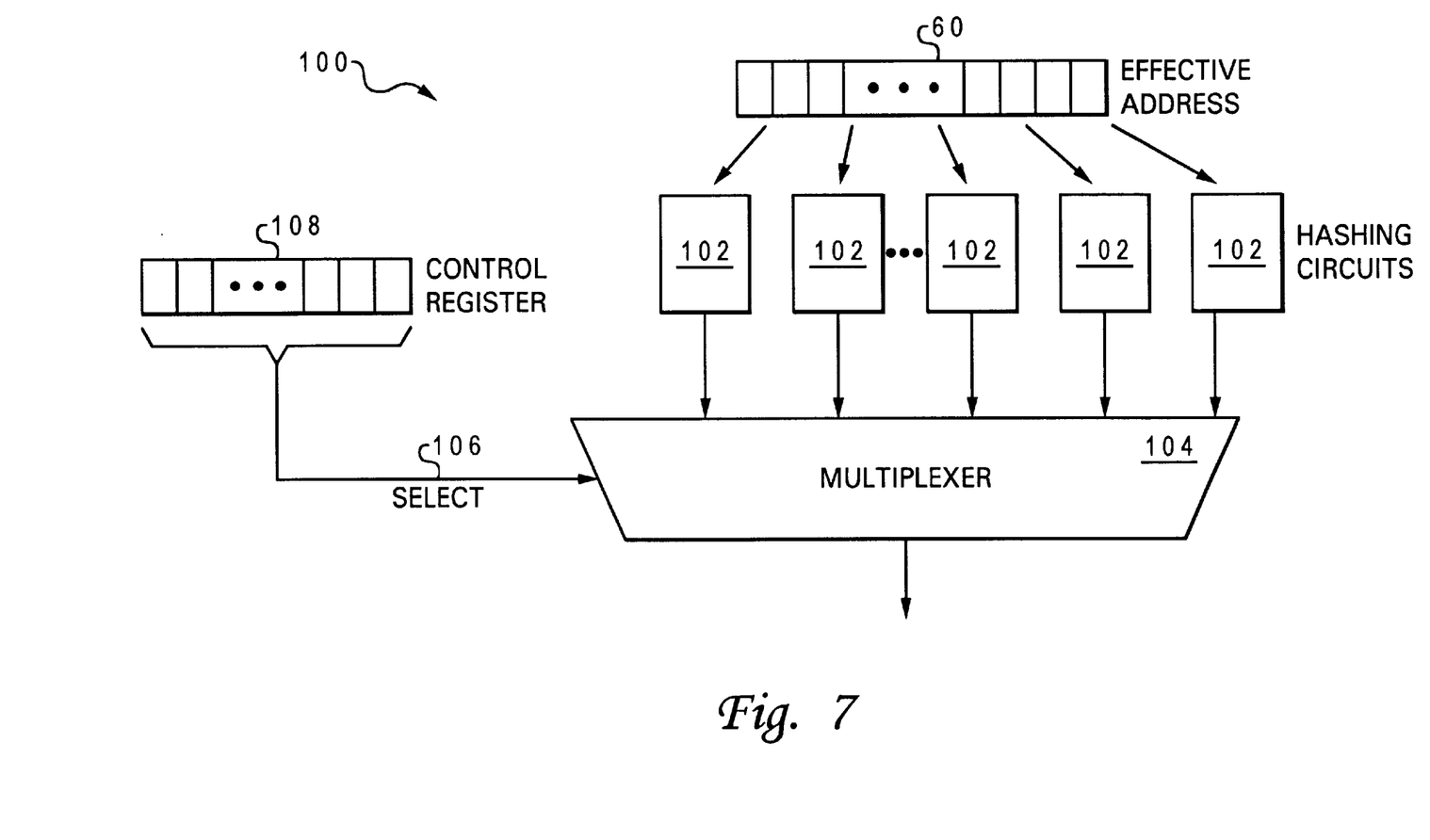
FIG. 7 depicts a block diagram of an illustrative embodiment of a hash selection circuit in accordance with the present invention.

With reference now to FIG. 7, there is depicted an exemplary embodiment of a hash selection circuit that supports dynamic changes to the hashing algorithm implemented by dispatch unit 44. Hash selection circuit 100 includes a number of hashing circuits 102 (one of which may be hashing circuit 50 of FIG. 3A) that each receive certain of the bits of effective address 60 as inputs and provide a hash output designating one of the hardware partitions. As noted above, the hashing algorithms implemented by hashing circuits 102 preferably differ, such that some of hashing circuits 102 hash addresses to fewer than all of the hardware partitions and others of hashing circuits 102 provide different hashes but still distribute addresses among all hardware partitions. The hash output of each hashing circuit 102 forms an input of multiplexer 104, which selects one of the hash outputs as its output in response to select signal 106. As illustrated, select signal 106 is derived from the contents of control register 108, which may in turn be set by either or both of monitoring software and monitoring hardware (e.g., performance monitor 60).

Once a dynamic update has been made to the control register 108 of a processor 10 within data processing system 8, coherent operation of data processing system 8 requires that a similar update be performed at each of the other processors 10. These updates can be handled by sourcing special transactions from the updated processor 10 on system interconnects 12 or by execution of a software exception handler that writes a new value to each other control register 108.

To minimize the performance penalty associated with a dynamic hash update, L2 caches 34 are preferably implemented such that full addresses are utilized and such that each L2 cache 34 snoops all address: transactions regardless of the address subset to which the address transactions belong. With this arrangement, a dynamic change in the address hash implemented by dispatch unit 44 would require only caches in a disabled hardware partition to be flushed. However, if each L2 cache 34 only snoops address transactions for its assigned address subset, all LSUs 24 and caches within each hardware partition from which any address is reassigned would have to be flushed prior to enforcing a dynamic change in the hash.

As has been described, the present invention provides an improved processor and data processing system architecture having a hashed and partitioned storage subsystem. The present invention not only enhances performance through increased hardware parallelism, but also permits the various hardware partitions to be individually optimized for the type of data contained in each address subset. Advantageously, the address subset assigned to each hardware partition can be changed dynamically by updating the hash, thus permitting runtime optimization and dynamic repair capability. The hashed and partitioned architecture of the present invention is also highly scalable and supports future increases in processor operating frequency through the addition of more hardware partitions.

While the invention has been particularly shown and described with reference to a preferred embodiment, it will be understood by those skilled in the art that various changes in form and detail may be made therein without departing from the spirit and scope of the invention. For example, although a compiler in accordance with the present invention can reside within the volatile and non-volatile storage of an operating data processing system, the compiler may alternatively be implemented as a program product for use with a data processing system. Such a program product can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A processor, comprising:

execution resources;

data storage; and an instruction sequencing unit, coupled to said execution resources and said data storage, that supplies instructions within said data storage to said execution resources;

wherein at least one of said execution resources and said instruction sequencing unit is implemented with a plurality of hardware partitions of like function, and wherein said processor selectively assigns data for processing by particular ones of said plurality of hardware partitions according to a selectable hash of addresses associated with said data.

2. The processor of claim 1, wherein said processor alters said selectable hash in response to detection of an error.

3. The processor of claim 1, wherein said processor alters said selectable hash dynamically during operation.

4. The processor of claim 1, wherein said processor alters said selectable hash in response to detection of a load imbalance between said plurality of hardware partitions.

5. The processor of claim 1, said instruction sequencing unit including a hash selection circuit that selects among a plurality of possible hashes and implements a selected one of said plurality of hashes.

6. The processor of claim 1, wherein said data storage and said execution resources are implemented with a same number of hardware partitions.

7. The processor of claim 1, wherein said instruction sequencing unit is implemented with a plurality of hardware partitions of like function.

8. A data processing system, comprising:

at least one interconnect;

at least one memory coupled to said interconnect; and at least one processor coupled to said interconnect, wherein said processing includes:

execution resources;

data storage; and an instruction sequencing unit, coupled to said execution resources and said data storage, that supplies instructions within said data storage to said execution resources;

wherein at least one of said execution resources and said instruction sequencing unit is implemented with a plurality of hardware partitions of like function, and wherein said processor selectively assigns data for processing by particular ones of said plurality of hardware partitions according to a selectable hash of addresses associated with said data.

9. The data processing system of claim 8 wherein said processor alters said selectable hash in response to detection of an error.

10. The data processing system of claim 8, wherein said processor alters said selectable hash dynamically during operation.

11. The data processing system of claim 8, wherein said processor alters said selectable hash in response to detection of a load imbalance between said plurality of hardware partitions.

12. The data processing system of claim 8, said instruction sequencing unit including a hash selection circuit that selects among a plurality of possible hashes and implements a selected one of said plurality of hashes.

13. The data processing system of claim 8, wherein said data storage and said execution resources are implemented with a same number of hardware partitions.

14. The data processing system of claim 8, wherein said instruction sequencing unit is implemented with a plurality of hardware partitions of like function.

15. A method of operating a processor, including execution resources, data storage, and an instruction sequencing unit, coupled to said execution resources and said data storage, that supplies instructions within said data storage to said execution resources, said method comprising:

processing data within a plurality of hardware partitions of like function, wherein at least one of said execution resources and said instruction sequencing unit is implemented with said plurality of hardware partitions, and wherein said data are assigned for processing by particular ones of said plurality of hardware partitions according to a selectable hash of addresses associated with said data; and reassigning at least some of said data to others of said plurality of hardware partitions by altering said selectable hash.

16. The method of claim 15, wherein reassigning at least some of said data comprises altering said selectable hash in response to detection of an error.

17. The method of claim 15, wherein reassigning at least some of said data comprises altering said selectable hash dynamically during operation of said processor.

18. The method of claim 15, where assigning at least some of said data comprises altering said selectable hash in response to detection of a load imbalance between said plurality of hardware partitions.

19. The method of claim 15, where in said instruction sequencing unit includes hash selection circuit having a plurality of diverse hashes, and wherein reassigning at least some of said data comprises selecting a different one of said plurality of diverse hashes.

20. The method of claim 15, wherein processing data within a plurality of hardware partitions of like function comprises processing said data within a corresponding plurality of hardware partitions in said data storage and within a corresponding plurality of hardware partitions in said execution resources.

* * * * *